US012694254B2

(12) United States Patent
Liang et al.

(10) Patent No.: US 12,694,254 B2
(45) Date of Patent: Jul. 28, 2026

(54) METHOD FOR IDENTIFYING BINARY DOT MATRIX CODE ON MOLD SURFACE

(71) Applicant: GUANGDONG POLYTECHNIC NORMAL UNIVERSITY, Guangzhou (CN)

(72) Inventors: Peng Liang, Guangzhou (CN); Hong Zhang, Guangzhou (CN); Mingqiang Luo, Guangzhou (CN); Gang Hao, Guangzhou (CN); Yukuan Liu, Guangzhou (CN); Yulin Tu, Guangzhou (CN); Xiaoguang Lu, Guangzhou (CN); Jianhua Guo, Guangzhou (CN); Weili Liu, Guangzhou (CN); Weijian Li, Guangzhou (CN)

(73) Assignee: GUANGDONG POLYTECHNIC NORMAL UNIVERSITY, Guangzhou (CN)

( * ) Notice: Subject to any disclaimer, the term of this patent is extended or adjusted under 35 U.S.C. 154(b) by 0 days.

(21) Appl. No.: 19/329,524

(22) Filed: Sep. 15, 2025

(65) Prior Publication Data

US 2026/0134247 A1 May 14, 2026

(30) Foreign Application Priority Data

Nov. 11, 2024 (CN) .......................... 202411599803.3

(51) Int. Cl.
*G06K 19/06* (2006.01)
*G06K 7/14* (2006.01)
*G06V 10/82* (2022.01)

(52) U.S. Cl.
CPC ..... *G06K 19/06037* (2013.01); *G06K 7/1482* (2013.01); *G06V 10/82* (2022.01)

(58) Field of Classification Search
CPC ... G06K 19/06037; G06K 7/146; G06V 10/82
See application file for complete search history.

(56) References Cited

FOREIGN PATENT DOCUMENTS

CN          108364259 A          8/2018
CN          111860027 A          10/2020
(Continued)

OTHER PUBLICATIONS

First Office Action in Chinese Application No. 202411599803.3 mailed on May 8, 2025, 14 pages.
(Continued)

*Primary Examiner* — Laura A Gudorf
(74) *Attorney, Agent, or Firm* — PORUS IP LLC

(57) ABSTRACT

The present disclosure relates to a process for identifying a binary dot matrix code on a mold surface, comprising: capturing a plurality of binary dot matrix code images of the mold surface; inputting the acquisition data into the YOLOv8 network model for training; recapturing the images to be tested and inputting them into the upgraded YOLOv8 network model for detection and output; calculating positional coordinates of vertices at the outermost periphery of the four bounding boxes based on the output results to obtain the distorted quadrilateral, which is converted into the square pattern by the perspective transformation; inputting the square pattern into the upgraded YOLOv8 network model for detection and outputting the results, and calculating the counterclockwise rotation angle θ; obtaining the standard pattern by rotating the square pattern by the angle θ; dividing the standard pattern into the image blocks with the same size in equal portions, and identifying the circular code points of the image blocks, concatenating the identification results to obtain the binary-encoded sequence data; and decoding the binary-encoded sequence data based on binary-encoded decoding rules, and (Continued)

100

S1 — Data acquisition
S2 — Model training
S3 — Fiducial marker detection
S4 — Calculating peripheral vertices
S5 — Perspective correction
S6 — Calculating a counterclockwise rotation angle
S7 — Rotational correction
S8 — Code point identification
Dividing a standard pattern into image blocks
Code point recognition within the image blocks
S9 — Decoding deriving corresponding binary-encoded character information.

8 Claims, 6 Drawing Sheets

(56) References Cited

FOREIGN PATENT DOCUMENTS

| CN | 114820620 A | 7/2022 |
| CN | 116612265 A | 8/2023 |
| CN | 117375623 A | 1/2024 |
| KR | 20240038554 A | 3/2024 |

OTHER PUBLICATIONS

Notification to Grant Patent Right for Invention in Chinese Application No. 202411599803.3 mailed on Jul. 16, 2025, 6 pages.
Liu, Yongping et al., Research on Mold Coding Recognition Method Based on Mask RCNN, Computer Knowledge and Technology, 17(10), 2021, 4 pages.

100

200

300

400

500

600

METHOD FOR IDENTIFYING BINARY DOT MATRIX CODE ON MOLD SURFACE

CROSS-REFERENCE TO RELATED APPLICATIONS

This application claims priority to the Chinese Patent Application No. 202411599803.3, filed on Nov. 11, 2024, the contents of which are hereby incorporated by reference.

TECHNICAL FIELD

The present disclosure relates to the field of binary dot matrix code identification, and in particular, to a process for identifying a binary dot matrix code on a mold surface.

BACKGROUND

Molds, known as the "mother of industry," are processing tools that shape raw materials and impart complete structures and precise dimensions, serving as essential key process equipment in industrial production. Metal precision molds exhibit two distinct characteristics: first, the vast variety of mold products, which vary significantly in size and have diverse requirements, demonstrating a "non-standardized" nature; second, high unit costs for the metal precision molds, which are classified as high-value consumables. Therefore, in order to extend the service life of the metal precision molds, the need for intelligent management of their entire life cycle is crucial, focusing on giving the metal molds a unique code mark and accurately identifying that code mark to obtain the mold information. Since molds are usually used in high temperature, high pressure, erosion by molten metal flow, corrosion, and other harsh scenarios, wear and tear on the mold code mark may occur; in addition, as the mold surfaces are rough and uneven and subject to air oxidation, this leads to varying colors of the mold surfaces. Therefore, how to achieve accurate identification of the mold code mark has become a difficult and complex technical problem.

At present, mold information marking and identification technology used in industry mainly includes four types: the first type is a mold surface intaglio character OCR identification technology, the second type is a mold surface paper barcode identification technology, the third type is a mold code identification technology based on QR codes, and the fourth type is a mold code identification technology based on the binary system.

The OCR-based identification technology for intaglio mold ID characters is achieved by using a milling cutter or steel stamp to create intaglio mold ID character codes on the mold surface, then the processed image undergoes character segmentation through an image processing process to separate the recessed characters from the background. The mold code characters are then identified using character identification technology (OCR). However, as the molds are used in various environments during different processes, the cod characters may be unclear, and the molds may develop rust spots. Additionally, errors in identifying character encoding may occur due to changes in lighting, image scaling, and image rotation. However, when the code characters are misidentified, the OCR technology-based identification process lacks the necessary error correction and checking mechanisms to ensure the accuracy of character identification. Moreover, in industrial production, the accuracy requirement is much higher than the leakage rate; if identification errors occur, they may lead to incorrect mold process records, significantly reducing the quality and efficiency of mold life cycle management.

The mold surface paper barcode identification technology involves attaching a paper barcode label to the mold surface and then using barcode scanning equipment to scan and identify the barcode. However, the process has certain limitations in practical applications. The molds undergo polishing (physical friction), alkaline washing (corrosion), nitriding (high temperature), and other processing during routine maintenance, which may damage the paper barcodes affixed to the mold surfaces. For example, the polishing process may wear off the barcode, alkaline washing may cause the label to fall off or become blurred, and high-temperature and high-pressure treatments, such as nitriding, are likely to directly damage the paper label. Throughout the mold's life cycle, it is necessary to reaffix the paper barcode multiple times. However, due to the mold's production state (high temperature, high pressure), when the barcode is damaged, it cannot be immediately reapplied. Thus, the process is not suitable for extrusion molds where information marking is managed in high-temperature and high-pressure environments.

The mold QR code identification technology involves engraving a QR code pattern on the mold surface using laser technology, followed by using QR code scanning equipment to scan and identify the QR code pattern. The advantage of the process is that there is no need to separately develop a scanning program; the code identification can be achieved using existing mature QR code scanning programs. However, the molds undergo polishing, alkaline washing, EDM, nitriding, and other processes during routine maintenance, which can also damage the QR code. Due to the inherent complexity of the QR code pattern, excessive damage to any area of the QR code can lead to non-identification. Moreover, after EDM, the molds may turn black, which closely resembles the color of the QR code's marking bits, leading to identification failures.

The image processing-based binary codes identification technology for molds designs a mold code pattern using binary dot matrix codes, which is much simpler than QR code patterns, significantly reducing identification difficulty. The process identifies and separates coded features such as length, width, and shape through edge detection and morphological operations. The codes are then identified by comparison using template matching techniques. However, the image processing-based binary codes identification process for molds requires parameter selection for edge detection, morphological operations, and template matching based on specific coded image positions, angles, and illumination. As a result, identification effectiveness is poor and accuracy is low under variable lighting, angle, and scale changes, which cannot meet actual production needs. Additionally, during the mold's life cycle, the mold surface changes from a shiny metallic color to black or even develops rust spots, which makes fixed parameters unsuitable for the changing mold surface colors.

Therefore, addressing the shortcomings of existing image processing-based binary codes identification technology for molds and improving the technology to adapt to dynamically changing mold metal surfaces is needed, while being able to cope with variations in binary dot matrix code lighting, pattern rotation, blurring, and size changes.

SUMMARY

Some embodiments of the present disclosure provide a process for identifying a binary dot matrix code on a mold surface, comprising:

Step S1, data acquisition: capturing a plurality of binary dot matrix code images of the mold surface by a camera, wherein a fiducial marker is arranged in each of four corners of each of the plurality of binary dot matrix code images, and a training set is constructed through annotating bounding boxes for each fiducial marker;

Step S2, model training: inputting data from the training set into a YOLOv8 network model to train the YOLOv8 network model to obtain optimal weight data of the YOLOv8 network model, and obtaining a trained and upgraded YOLOv8 network Step S3, fiducial marker detection: capturing binary dot matrix code images of a mold surface to be tested by the camera to form a test set, inputting images of the test set to the trained and upgraded YOLOv8 network model, and outputting corner points of four bounding boxes of data of the test set by model training, each of the four bounding boxes is provided with 4 corner points, respectively, totaling 16 corner points;

Step S4, calculating peripheral vertices: filtering the 16 corner points by a filtering strategy, and calculating positional coordinates of vertices at the outermost periphery of the four bounding boxes;

Step S5, perspective correction: obtaining a distorted quadrilateral based on the positional coordinates of the vertices at the outermost periphery of the four bounding boxes, and converting the distorted quadrilateral into a standard L×L square pattern by perspective transformation;

Step S6, calculating a counterclockwise rotation angle: inputting the square pattern obtained in the step S5 into the trained and upgraded YOLOv8 network model of the step S2 for detection, and outputting four corner points of bounding boxes corresponding to a fiducial marker of the square pattern;

Obtaining a coordinate of a center point G of the bounding boxes based on the four corner points of the bounding boxes;

Comparing the coordinate of the center point G of the bounding boxes with a coordinate of a center point $$O\left(\frac{L}{2}, \frac{L}{2}\right)$$

of the square pattern obtained in the step S5 to obtain a counterclockwise rotation angle $\theta$ of the square pattern;

Step S7, rotational correction: rotating the square pattern of the step S5 counterclockwise by an angle $\theta$ by affine transformation to align the square pattern to a correct position to obtain a standard pattern of binary dot matrix code images of the test set;

Step S8, code point identification: dividing the standard pattern into image blocks with a same size in equal portions based on a dimension of binary code dots; and inputting the image blocks into the trained and upgraded YOLOv8 network model of the step S2 sequentially in the order of top to bottom and left to right for identification;

In response to determining that a code point exists in the image blocks, outputting 1, and in response to determining that there is no code point in the image blocks, outputting 0;

Concatenating identification results to obtain binary-encoded sequence data; and Step S9, decoding: decoding the binary-encoded sequence data based on binary-encoded decoding rules, and deriving corresponding binary-encoded character information.

In some embodiments, the filtering strategy in step S4 is categorized into two types, and the filtering strategy includes a first filtering strategy and a second filtering strategy, wherein:

A filtering process of the first filtering strategy is as follows:

Step S4-$a$1: constructing the 16 corner points of the four bounding boxes outputted by the YOLOv8 network model in the Step S3 into a set P, Wherein each corner point is denoted as $a_{ij}$, a coordinate of each corner point is denoted as $(x_{ij}, y_{ij})$, i denotes numbers of the bounding boxes, which takes a range of $i \in \{1,2,3,4\}$, and j denotes the j point of the four corner points of the bounding boxes, which takes a range of $j \in \{1,2,3,4\}$;

Step S4-$a$2: coordinate information of four corner points of a first bounding box including:

A coordinate of $a_{11}$ being denoted as $(x_{11}, y_{11})$, a coordinate of $a_{12}$ being denoted as $(x_{12}, y_{12})$, a coordinate of $a_{13}$ being denoted as $(x_{13}, y_{13})$, a coordinate of $a_{14}$ being denoted as $(x_{14}, y_{14})$;

Step S4-$a$3: assuming that positional coordinates of vertices at the outermost periphery of the four bounding boxes are $Q_1(x_{Q1}, y_{Q1})$, $Q_2(x_{Q2}, y_{Q2})$, $Q_3(x_{Q3}, y_{Q3})$, $Q_4(x_{Q4}, y_{Q4})$, and $Q_1$ is located at a topmost part of a binary dot matrix code pattern, $Q_2$ is located at a bottom part of the binary dot matrix code pattern, $Q_3$ is located at a leftmost part of the binary dot matrix code pattern, and $Q_4$ is located at a rightmost part of the binary dot matrix code pattern, coordinates of individual vertices being calculated as follows:

$Q_1$ is located at the topmost part of the binary dot matrix code pattern, which with a vertical coordinate $y_{Q_1}$ is a point with a smallest vertical coordinate in the set P, as shown in equations (1) and (2) below:

$$y_{Q_1} = \min(y_{ij}), i, j \in [1, 4] \tag{1}$$

$$Q_1 = \{(x_{ij}, y_{ij}) \in P, y_{ij} = y_{Q_1}\}, i, j \in [1, 4] \tag{2}$$

$Q_2$ is located at the bottom part of the binary dot matrix code pattern, which with a longitudinal coordinate $y_{Q_2}$ is a point with a largest longitudinal coordinate in the set P, as shown in equations (3) and (4) below: $y_{Q_2} = \max(y_{ij})$, $i, j \in [1,4]$ $$Q_2 = \{(x_{ij}, y_{ij}) \in P, y_{ij} = y_{Q_2}\}, i, j \in [1, 4] \tag{4}$$

$Q_3$ is located at the leftmost part of the binary dot matrix code pattern, which with a transverse coordinate $x_{Q_3}$ is a smallest transverse coordinate in the set P, as shown in equations (5) and (6) below:

$$x_{Q_3} = \min(x_{ij}), i, j \in [1, 4] \tag{5}$$

-continued $$Q_3 = \{(x_{ij}, y_{ij}) \in P, \ x_{ij} = x_{Q_3}\}, \ i, j \in [1, 4] \tag{6}$$

$Q_4$ is located at the rightmost part of the binary dot matrix code pattern, which a transverse coordinate $x_{Q_4}$ is a largest transverse coordinate in the set P, as shown in equations (7) and (8) below:

$$x_{Q_4} = \max(x_{ij}), \ i, j \in [1, 4] \tag{7}$$

$$Q_4 = \{(x_{ij}, y_{ij}) \in P, \ x_{ij} = x_{Q_4}\}, \ i, j \in [1, 4]. \tag{8}$$

In some embodiments, a filtering process of the second filtering strategy is as follows:

Constructing the 16 corner points of the four bounding boxes outputted by the YOLOv8 network model in the Step S3 into the set W, wherein each coordinate of each point $w_m$ is $(x_m, y_m)$;

Wherein for any point, a distance between the point $w_m$ from the other 15 corner points $w_n (m \neq n)$ is defined as $d(w_m, w_n)$, which is calculated using a Euclidean distance equation (9):

$$d(w_m, w_n) = \sqrt{(x_m - x_n)^2 + (y_m - y_n)^2}, \ m, n \in [1, 16], \ m \neq n \tag{9}$$

Calculating a sum of distances between the point $w_m$ and the other 15 corner points using a following equation (10):

$$S_{w_m} = \sum_{n=1, m \neq n}^{16} d(w_m, w_n), \ m, n \in [1, 16] \tag{10}$$

By comparing all $S_{w_m}$, selecting points corresponding to a first 4 largest $S_{w_m}$ as four peripheral vertices of the binary dot matrix code, wherein an expression equation is as follows:

Assuming that all $w_m$ are sorted in descending order to obtain a sorted sequence as follows (11):

$$S_{w_1} \geq S_{w_2} \geq \ldots \geq S_{w_{16}} \tag{11}$$

Selecting a set P' corresponding to points of the first 4 largest $S_{w_m}$ as:

$$P' = \{w_1, w_2, w_3, w_4\} \tag{12}$$

In some embodiments, wherein a transformation equation of the perspective transformation is a transformation process of converting a pixel coordinate (u,v) to a point on a three-dimensional world coordinate system, and transforming the point to another pixel coordinate (x',y'), A transformation equation (13) of the perspective transformation is as follows:

$$\begin{bmatrix} x' \\ y' \\ z' \end{bmatrix} = \begin{bmatrix} b_{11} & b_{12} & b_{13} \\ b_{21} & b_{22} & b_{23} \\ b_{31} & b_{32} & b_{33} \end{bmatrix} \begin{bmatrix} u \\ v \\ 1 \end{bmatrix} \tag{13}$$

Wherein a coordinate of an original image in a two-dimensional plane is (u,v), (x',y',z') is a coordinate of a converted three-dimensional world:

the perspective transformation matrix $$\begin{bmatrix} b_{11} & b_{12} & b_{13} \\ b_{21} & b_{22} & b_{23} \\ b_{31} & b_{32} & b_{33} \end{bmatrix}$$

is split into 3 parts, $$\begin{pmatrix} b_{11} & b_{12} \\ b_{21} & b_{22} \end{pmatrix}$$

is configured as linear transformation, $$\begin{pmatrix} b_{13} \\ b_{23} \end{pmatrix}$$

is configured as the perspective transformation, $(b_{31}, b_{32})$ is configured as translation operation.

In some embodiments, in the perspective transformation, a pixel coordinate (u,v) is transformed to a point on the three-dimensional world coordinate system, and transformed to a new two-dimensional plane to obtain a corrected coordinate of (x,y), and equations (14) and (15) is shown as follows:

$$x = \frac{x'}{z'} = \frac{b_{11}u + b_{21}v + b_{31}}{b_{13}u + b_{23}v + b_{33}} \tag{14}$$

$$y = \frac{y'}{z'} = \frac{b_{12}u + b_{22}v + b_{32}}{b_{13}u + b_{23}v + b_{33}} \tag{15}$$

In some embodiments, the obtaining the counterclockwise rotation angle $\theta$ of the square pattern in the step S6 includes:

Step S6-1: assuming that the four corner points of the bounding boxes corresponding to the fiducial marker of the square pattern are denoted as $T_r$ and coordinates are denoted as $(x_r, y_r)$, wherein $r \in [1,4]$, coordinates of the center point $G(x_G, y_G)$ of the bounding boxes and the center point G of the bounding boxes is calculating by equations (16) and (17):

$$x_G = \frac{\sum_{r=1}^{4} x_r}{4} \tag{16}$$

$$y_G = \frac{\sum_{r=1}^{4} y_r}{4} \tag{17}$$

Step S6-2: determining the counterclockwise rotation angle of the square pattern by comparing the coordinate of the center point $G(x_G, y_G)$ of the bounding boxes with a coordinate of a center point $$O\left(\frac{L}{2}, \frac{L}{2}\right)$$

of the square pattern of the step S5, wherein a corresponding relationship is as follows:

$$\theta = \begin{cases} 0, & x_G > \dfrac{L}{2} \text{ and } y_G > \dfrac{L}{2} \\ 90, & x_G < \dfrac{L}{2} \text{ and } y_G > \dfrac{L}{2} \\ 180, & x_G < \dfrac{L}{2} \text{ and } y_G < \dfrac{L}{2} \\ 270, & x_G > \dfrac{L}{2} \text{ and } y_G < \dfrac{L}{2} \end{cases} \tag{18}$$

In some embodiments, the obtaining the standard pattern of binary dot matrix code images of the test set in the step S7 includes:

Assuming that a point $U(x_u, y_u)$ on the binary dot matrix code pattern after the perspective correction in the step S5 is rotated counterclockwise by an angle $\theta$; wherein a rotation process is as follows:

Calculating a coordinate $(x_c, y_c)$ of the point $U(x_u, y_u)$ with respect to the center point $$O\left(\frac{L}{2}, \frac{L}{2}\right):$$

$$x_c = x_u - \frac{L}{2} \tag{19}$$

$$y_c = y_u - \frac{L}{2} \tag{20}$$

Applying a rotation matrix R to rotate $(x_c, y_c)$ to obtain a coordinate $(x_h, y_h)$:

$$R = \begin{bmatrix} \cos(\theta) & -\sin(\theta) \\ \sin(\theta) & \cos(\theta) \end{bmatrix} \tag{21}$$

$$\begin{bmatrix} x_h \\ y_h \end{bmatrix} = R \cdot \begin{bmatrix} x_c \\ y_c \end{bmatrix} \tag{22}$$

Translating $(x_h, y_h)$ back to an original position to obtain a final rotation point $U'(x_{new}, y_{new})$:

$$x_{new} = x_h + \frac{L}{2} \tag{23}$$

$$y_{new} = y_h + \frac{L}{2} \tag{24}$$

By combining the above steps, obtaining coordinate $U(x_u, y_u)$ by rotating the point $U'(x_{new}, y_{new})$ about the center point by the angle $\theta$:

$$x_{new} = \cos(\theta) \cdot \left(x_u - \frac{L}{2}\right) - \sin(\theta) \cdot \left(y_u - \frac{L}{2}\right) + \frac{L}{2} \tag{25}$$

$$y_{new} = \sin(\theta) \cdot \left(x_u - \frac{L}{2}\right) - \cos(\theta) \cdot \left(y_u - \frac{L}{2}\right) + \frac{L}{2} \tag{26}$$

In some embodiments, the code point identification in the step S8 includes:

Step S8-1, dividing a binary dot matrix code standard pattern into the image blocks: based on the dimension of the binary code dots, dividing the binary dot matrix code standard pattern rotated to the correct position in the step S7 into the image blocks with the same size in equal portions, Step S8-2, image blocks identification code point: identifying circular binary code points of the image blocks sequentially in the order of top to bottom and left to right by using the trained and upgraded YOLOv8 network model in the step S2, in response to determining that a code point exists in the image blocks, outputting 1, and in response to determining that there is no code point in the image blocks, outputting 0, identifying and obtaining a binary coding sequence 01.

BRIEF DESCRIPTION OF THE DRAWINGS

The present disclosure is further described in terms of exemplary embodiments. These exemplary embodiments are described in detail with reference to the drawings. These embodiments are not limiting, and in these embodiments, the same numbering denotes the same structure, wherein.

DETAILED DESCRIPTION

Figure 1:
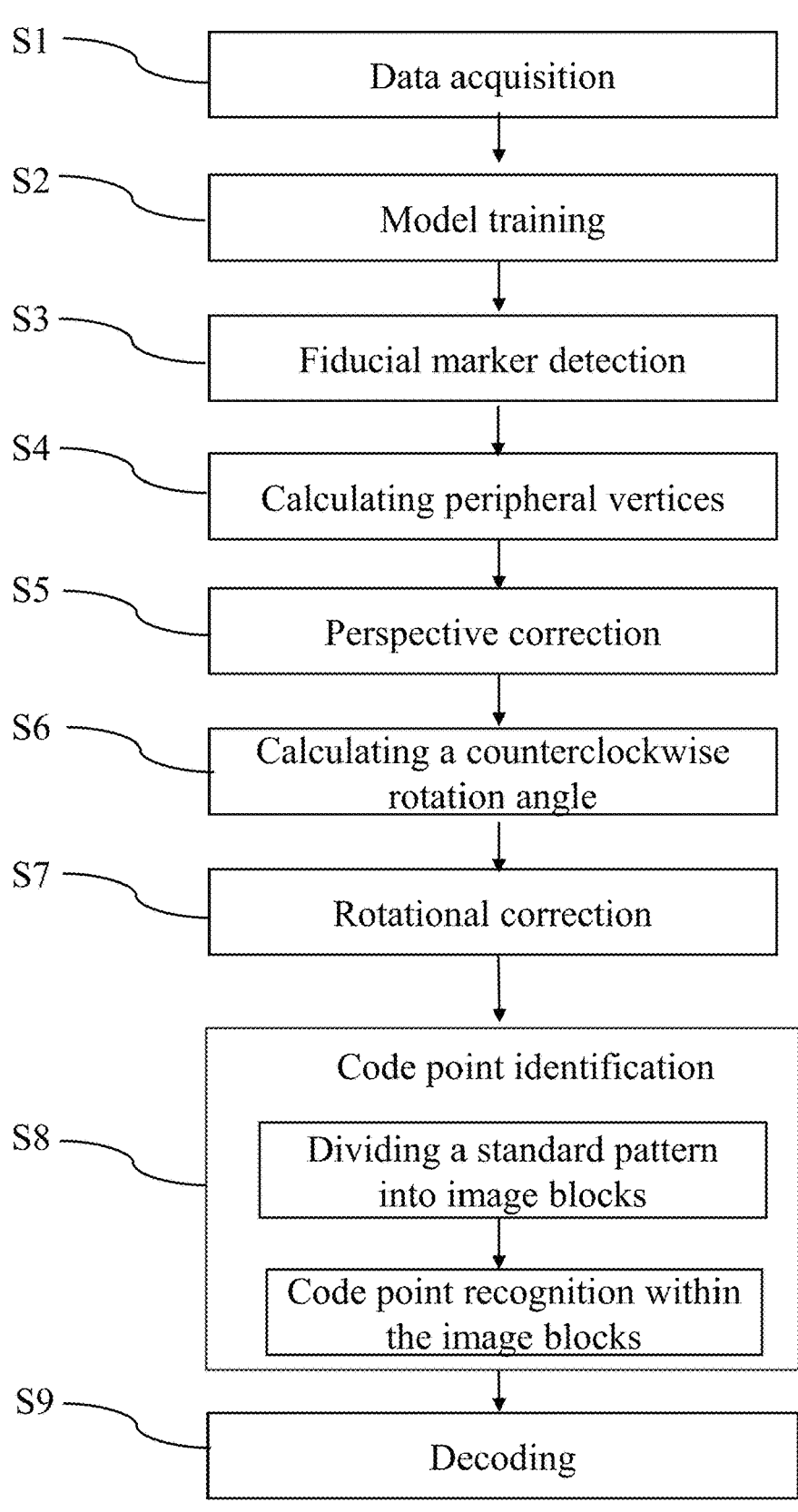
FIG. 1 is a flowchart illustrating an exemplary process for identifying a binary dot matrix code on a mold surface according to some embodiments of the present disclosure.

In the following detailed description, numerous specific details are set forth by way of examples in order to provide a thorough understanding of the relevant disclosure. Obviously, the accompanying drawings in the following description are only some examples or embodiments of the present specification, and it is possible for a person of ordinary skill in the art to apply the present specification to other similar scenarios in accordance with these drawings without creative labor. Unless obviously obtained from the context or the context illustrates otherwise, the same numeral in the drawings refers to the same structure or operation.

Flowcharts are used in this specification to illustrate operations performed by a system in accordance with embodiments of this specification. It should be appreciated that the preceding or following operations are not necessarily performed in an exact sequence. Instead, steps may be processed in reverse order or simultaneously. Also, it is possible to add other operations to these processes or remove a step or steps from them.

In some embodiments, preparing rules of binary dot matrix code images on a mold surface include encoding using a mold encode process based on a binary system, the process includes character encode: converting identification (ID) characters used to mark the mold into character binary codes through a character encoding table; error correction codes generation: generating the error correction codes based on ReedSolomon encoding principle, and converting the error correction condes into error correction binary codes; marking pattern generation: arranging the error correction binary codes in sequence after the character binary codes to generate a combined binary code, and generating an N*M rectangular marking pattern; code marking: engraving the coding pattern onto the mold surface; code identification and decoding: using image identification technology to identify the marking pattern, converting it to binary coding, and decoding.

Embodiments of the present disclosure provide a process for identifying a binary dot matrix code on the mold surface by encoding on the basis of the above.

FIG. 1 is a flowchart illustrating an exemplary process for identifying a binary dot matrix code on a mold surface according to some embodiments of the present disclosure.

In some embodiments, as shown in FIG. 1, a process for identifying the binary dot matrix code on the mold surface includes:

Step S1, data acquisition: capturing a plurality of binary dot matrix code images of the mold surface by a camera, wherein a fiducial marker is arranged in each of four corners of each of the plurality of binary dot matrix code images, and a training set is constructed through annotating bounding boxes for each fiducial marker.

The binary dot matrix code image is an image of the binary dot matrix code captured by the camera. More descriptions of preparing the binary dot matrix code images on the mold surface may be found in the above descriptions.

Figure 2:
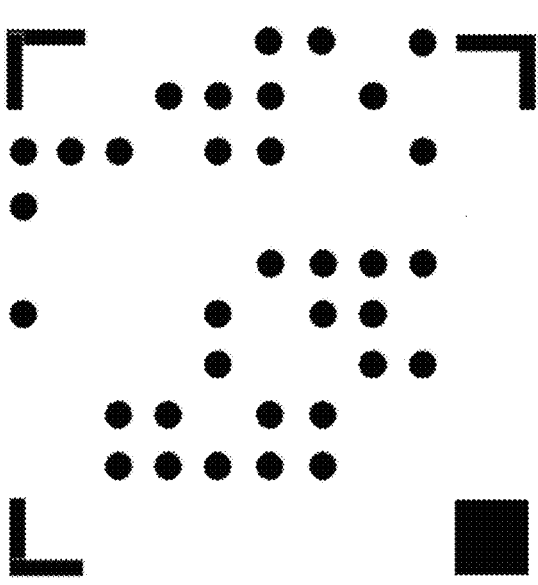
FIG. 2 is a schematic diagram illustrating a standard pattern of a binary dot matrix code according to some embodiments of the present disclosure.

FIG. 2 is a schematic diagram illustrating a standard pattern of a binary dot matrix code according to some embodiments of the present disclosure.

In some embodiments, as shown in FIG. 2, a fiducial marker is arranged in each of four corners of each of a plurality of binary dot matrix code images. The fiducial marker refers to a fiducial symbol characterized by specific geometry and high visual contrast, which is fixedly arranged in each of the four corners of the binary dot matrix code, and serves as a spatial reference and a basis for orientation calibration for image identification. In some embodiments, the fiducial marker may be L-shaped, square, concentric rings, zigzags, or the like.

Figure 3:
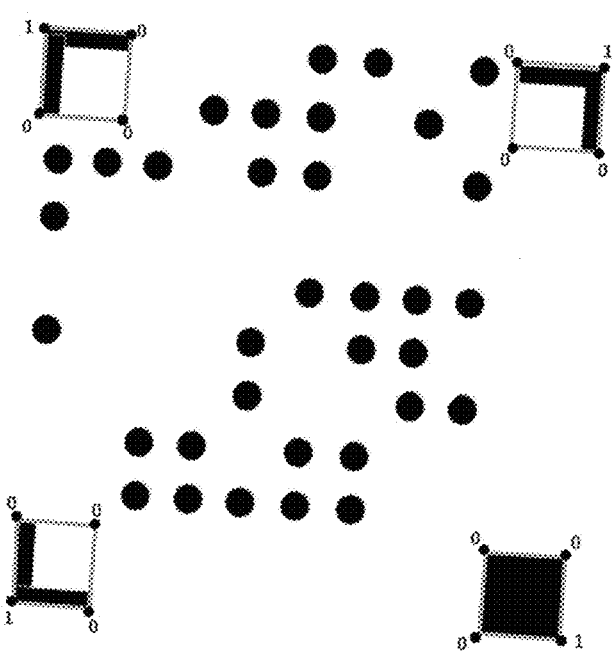
FIG. 3 is a schematic diagram illustrating target detection for a fiducial marker according to some embodiments of the present disclosure.

FIG. 3 is a schematic diagram illustrating target detection for a fiducial marker according to some embodiments of the present disclosure.

In some embodiments, a process of constructing a training set through annotating bounding boxes for each fiducial marker mainly includes the following operations: image preprocessing, tool annotation operation, and training set construction. The original image preprocessing refers to uniformly scaling the captured binary dot matrix code images to the same size and removing the unclear images. The annotation tool operation refers to using an annotation tool to annotate the images after the image preprocessing, as shown in FIG. 3, a bounding box is drawn along the outer edge of the fiducial marker. The annotation tool includes Labellmg, CVAT, or the like. The training set construction refers to performing data augmentation (e.g., simulating oil stain occlusion, rotating images) after storing the image preprocessed images and annotation files, and converting the annotations into a target framework format (e.g., YOLO txt), finally forming a structured directory to support the model training.

Figure 4:
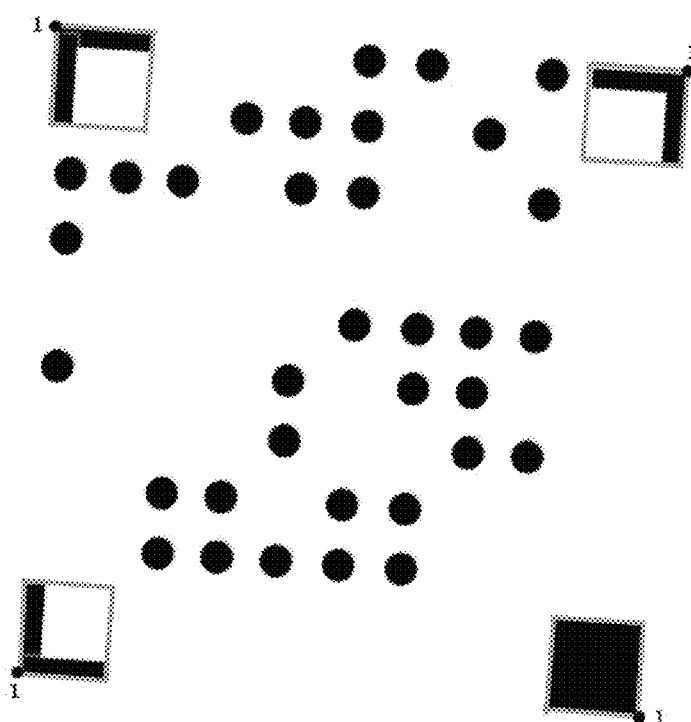
FIG. 4 is a schematic diagram illustrating vertices of a binary dot matrix code according to some embodiments of the present disclosure.

FIG. 4 is a schematic diagram illustrating vertices of a binary dot matrix code according to some embodiments of the present disclosure.

For example, as shown in FIG. 3 and FIG. 4, a gray box represents a bounding box. The small black dots within the bounding box represent corner points of the bounding box.

0 represents ordinary corner points, while 1 represents vertices at the outermost periphery of the binary dot matrix code image.

Step S2, model training: inputting data from the training set into a YOLOv8 network model to train the YOLOv8 network model to obtain optimal weight data of the YOLOv8 network model, and obtaining a trained and upgraded YOLOv8 network model by loading the optimal weight data into the YOLOv8 network model again.

It should be noted that the YOLOv8 network model may be an existing network model. The YOLOv8 Network model is a State of the Art (SOTA) model, which builds on the success of previous YOLO versions and introduces new features and improvements, including a new backbone network, a new Anchor-Free detection head, and a new loss function. The model runs on various hardware platforms, from CPU to GPU. The YOLOv8 model supports a full range of visual AI tasks, including detection, segmentation, pose estimation, tracking, and classification.

Step S3, fiducial marker detection: capturing binary dot-matrix code images of a mold surface to be tested by a camera to form a test set, inputting images of the test set to the trained and upgraded YOLOv8 network model, and outputting corner points of four bounding boxes of data of the test set by model training, each of the four bounding boxes is provided with 4 corner points, respectively, totaling 16 corner points.

Exemplarily, as shown in FIG. 3, the points labeled as 0 and 1 in the figure are the corner points of the bounding box.

In some embodiments, a process for identifying the binary dot matrix code on the mold surface further includes: capturing a mold to be tested by the camera at a preset shooting angle, and obtaining the binary dot matrix code images of the mold surface to be tested.

The mold to be tested refers to a mold for which the binary dot matrix code needs to be identified.

The shooting angle refers to a deviation angle between a shooting plane of the camera and the mold surface to be tested. The deviation angle refers to an angle between the shooting plane of the camera and the plane where the mold surface to be tested is located or an angle between a normal vector of the shooting plane of the camera and a normal vector of the plane where the mold surface to be tested is located. For example, if the camera is directly facing the mold to be tested, it may be understood that the shooting plane of the camera is parallel to the plane where the mold surface to be tested is located, and thus the preset shooting angle is 0°.

The preset shooting angle refers to a shooting angle that is set in advance. In some embodiments, a value of the preset shooting angle is controlled within a preset angle range, which may ensure that the obtained binary dot matrix code images of the mold surface to be tested completely contain corner point regions used for the subsequent perspective correction and rotational correction. The corner point regions refer to regions covered by the corner points of the fiducial marker in the binary dot matrix code images. For example, the corner point regions include the four corner points of the bounding box of each fiducial marker. In some embodiments, the value of the preset shooting angle may be not greater than 30°.

In some embodiments, the preset shooting angle is determined by querying a first preset table based on a mold material of the mold to be tested, a surface roughness degree, and a dot matrix code engraving process.

The mold material refers to a material used for the mold surface. For example, the mold materials include stainless steel, aluminum alloy, blackened steel, or the like. The mold material may be determined by a technician or obtained from a third party (e.g., a mold manufacturer).

The surface roughness degree refers to a quantitative index of microscopic unevenness of the mold surface. The surface roughness degree may be obtained by a third-party inspection or a stylus profiler.

The dot matrix code engraving process refers to a forming process of binary dot matrix codes on the mold. For example, the dot matrix code engraving process includes laser etching, mechanical etching/stamping, inkjet/thermal transfer printing, or the like. The dot matrix code engraving process may be determined by a skilled person or obtained from a third party.

The first preset table includes a plurality of reference data sets, each set of the plurality of reference data sets includes a reference mold material, a reference surface roughness degree, a reference dot matrix code engraving process, and a plurality of corresponding reference shooting angles and a priority of each of the plurality of reference shooting angles.

The first preset table may be determined in various ways. For example, the first preset table may be predetermined by a skilled person based on experience. As another example, the first preset table may be determined experimentally.

In some embodiments, the processor designates a corresponding reference shooting angle of a reference mold material, a reference surface roughness degree, and a reference dot matrix code engraving process corresponding to a current mold material, a current mold surface roughness degree, and a current dot matrix code engraving process in the first preset table as the preset shooting angle.

In some embodiments of the present disclosure, the processor performs a process for identifying the binary dot matrix code on the mold surface. The processor is configured to process data/information related to the identification of the binary dot matrix code for the mold surface. In some embodiments, the processor is also configured to control the mold to perform work, for example, the processor is configured to control the mold to perform die-casting, injection molding, and other tasks. Exemplarily, the processor may include a central processing unit (CPU), an application-specific integrated circuit (ASIC), an image processor (GPU), a physical operations processing unit (PPU), a digital signal processor (DSP), etc. or any combination thereof.

In some embodiments, the process for identifying the binary dot matrix code on the mold surface further includes determining the plurality of the reference shooting angles and a priority for each of the plurality of reference shooting angles of each set of the plurality of reference data sets.

In some embodiments, the determining the plurality of the reference shooting angles and the priority for each of the plurality of reference shooting angles of each set of the plurality of reference data sets includes: for the reference mold corresponding to the reference mold material, the reference surface roughness degree, and the reference dot matrix code engraving process, obtaining a plurality of the binary dot matrix images of the reference mold at a plurality of shooting angles, and determining a detection result of the binary dot matrix code images; dividing a plurality of successful connectivity domains and a plurality of failed connectivity domains based on the detection result; determining, for each of the plurality of successful connectivity domains, an effective identification value of each of the plurality of successful connectivity domains, based on an area of an inner circle of the successful connectivity domain and an area of a plurality of failed connectivity domains adjacent to the successful connectivity domain; determining a target successful connectivity domain based on the effective identification value; determining the plurality of the reference shooting angles and the priority for each of the plurality of reference shooting angles based on the target successful connectivity domain.

The reference mold refers to a mold used for experiments for determining the first preset table.

The reference data refers to data associated with the reference mold. For example, the reference mold material, the reference surface roughness degree, and the reference dot matrix code engraving process corresponds to the mold material, the surface roughness degree, and the dot matrix code engraving process of the reference mold, respectively.

The plurality of the reference shooting angles may be randomly selected.

In some embodiments, the fiducial markers on the four corners of the binary dot matrix code images are detected, and the validity of the encoded content is verified by a checksum or verification mechanism in the detection result. If the encoded content is valid, the detection result is successful, and the camera position at the shooting angle corresponding to the binary dot matrix code image is taken as a successful position. If the coded content is invalid, the detection result is a failure, and the camera position under the shooting angle corresponding to the binary dot matrix code image is taken as the failed position.

Based on the detection result, the processor may divide multiple successful connectivity domains and multiple failed connectivity domains by multiple algorithms. For example, a connectivity domain analysis algorithm using the two-pass algorithm may divide a plurality of successful positions and a plurality of failed positions into a plurality of successful connectivity domains and a plurality of failed connectivity domains, respectively.

An effective identification value of the successful connectivity domains may be expressed as a ratio of the area of an inner circle of the successful connectivity domains to a sum of the areas of the plurality of failed connectivity domains adjacent to the successful connectivity domains. The larger the area of the inner circle of the successful connectivity domains, and the smaller the area of the plurality of failed connectivity domains adjacent to the successful connectivity domains, the larger the effective identification value of the successful connectivity domains.

In some embodiments, the processor may regard the successful connectivity domains with the largest effective identification value as the target successful connectivity domain.

Based on the target successful connectivity domain, the processor may determine the plurality of reference shooting angles in various ways. For example, for each target successful connectivity domain, a plurality of positions within the target successful connectivity domain are randomly selected, and the camera is placed at each of the plurality of positions, respectively. The deviation angle between the shooting plane of the camera corresponding to the plurality of positions and the reference mold surface is taken as the reference shooting angle.

In some embodiments, the processor may determine a geometric center point of the target successful connectivity domain and calculate the distance between the position of the reference shooting angle and the geometric center point. The priority may be determined based on the distance between the position of the preset shooting angle and the geometric center point. The priority of the preset shooting angle corresponding to the closest distance is set to the highest, and the priority of the preset shooting angle corresponding to the furthest distance is set to the lowest.

In some embodiments, when using the first preset table, a reference shooting angle with the highest priority may be preferentially selected.

Based on factors affecting reflection such as the mold material and the surface roughness degree, and the dot matrix code engraving process, controlling the shooting angle when capturing the binary dot matrix code images can ensure the identification effect, which helps to improve the effectiveness of the binary dot matrix code images and the stability of the model identification from the source.

In some embodiments, the process for identifying the mold surface binary dot matrix code also includes: in response to obtaining the binary dot matrix code images captured by the camera, determining the detection result of the binary dot matrix code images; in response to the detection result being a failure, recording the current shooting angle into an invalid data set; querying the first preset table for the preset shooting angles not in the invalid data set based on the mold material of the mold to be tested, the mold surface roughness degree, and the dot matrix code engraving process; in response to the first preset table containing a reference shooting angle not in the invalid data set, obtaining a reference shooting angle with the highest priority corresponding to the reference mold material, the reference surface roughness degree, and the reference dot matrix code engraving process in the first preset table as an updated shooting angle; controlling the camera to capture the binary dot matrix code images of the mold surface to be tested at the updated shooting angle; in response to the first preset table not containing a reference shooting angle not in the invalid data set, clearing the invalid data set and controlling the manipulator to grasp the mold to a preset area for re-inspection; in response to the detection result being a success, clearing the invalid data set and executing subsequent operations.

The invalid data set refers to a data set of shooting angles that have already been used. For example, in the first preset table, a plurality of reference shooting angles corresponding to the reference mold material, the reference surface roughness degree, and the reference dot matrix code engraving process of each reference mold. If the reference shooting angles in the first preset table include shooting angles A, B, and C, and shooting angle A has already been used, then the invalid data set includes shooting angle A, and shooting angles B and C (the priority corresponding to shooting angle B is higher than that corresponding to shooting angle C) are the reference shooting angles not in the invalid data set.

In some embodiments, the processor, in response to the first preset table containing a reference shooting angle not in the invalid data set (e.g., shooting angles B and C), takes the shooting angle C with the highest priority as the updated shooting angle, and controls the camera to capture the binary dot matrix code images of the mold surface to be tested at the updated shooting angle (e.g., shooting angle C).

If the reference shooting angles in the first preset table include shooting angles A, B, and C, and shooting angles A, B, and C have all been used, then the invalid data set includes shooting angles A, B, and C. At this time, there is no reference shooting angle that is not in the invalid data set.

In some embodiments, the processor, in response to the first preset table not containing the preset shooting angles not in the invalid data set, clears the invalid data set and controls the manipulator to grasp the mold to the preset area for re-inspection.

The preset area may be determined by a technician based on experience.

The re-inspection is performed by a technician. For example, a technician identifies the binary dot matrix code on the mold surface by scanning.

By determining the shooting angle based on the mold material, the surface roughness degree, and the dot matrix code engraving process, when the identification accuracy of the binary dot matrix code images captured at this shooting angle is insufficient, a secondary calibration of the shooting angle or mechanical sorting may be automatically triggered, which can further prevent low-quality data from flowing into the production line.

Step S4, calculating peripheral vertices: filtering the 16 corner points by a filtering strategy, and calculating positional coordinates of vertices at the outermost periphery of the four bounding boxes.

Exemplarily, as shown in FIG. 4, the points marked as 1 are vertices at the outermost periphery of the four bounding boxes. The positions of the vertices at the outermost periphery of the four bounding boxes correspond to the topmost, bottommost, leftmost, and rightmost points of an entire binary dot matrix code pattern, respectively.

In some embodiments, a filtering strategy is categorized into two types, and the filtering strategy includes a first filtering strategy and a second filtering strategy.

A filtering process of the first filtering strategy is as follows:

Step S4-$a1$: constructing the 16 corner points of the four bounding boxes outputted by the YOLOv8 network model in the Step S3 into a set P, wherein each corner point is denoted as $a_{ij}$, a coordinate of each corner point is denoted as $(x_{ij},y_{ij})$, i denotes numbers of the bounding boxes, which takes a range of $i \in \{1,2,3,4\}$, and j denotes the j point of the four corner points of the bounding boxes, which takes a range of $j \in \{1,2,3,4\}$.

It should be noted that the coordinates mentioned in the present disclosure refer to digital image coordinates. In this system, the coordinate origin (0, 0) is at the top-left corner. This is different from conventional two-dimensional coordinates, where the origin is at the bottom-left corner.

The coordinates mentioned in the present disclosure are pixel coordinates of a digital image. In the digital image, origin of the pixel coordinates (0,0) is usually located in an upper left corner of the image. The coordinate x represents a horizontal position of the pixel: x=0 is a leftmost side of the image, and the pixel moves to the right as the value of x increases. The coordinate y represents a vertical position of the pixel: y=0 is a topmost side of the image, and the pixel moves downward as the value of y increases.

Figure 5:
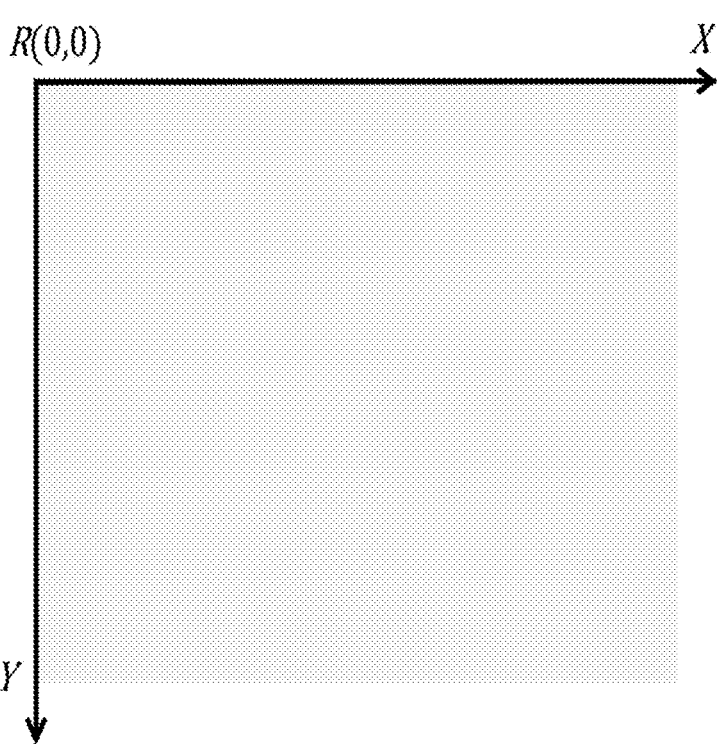
FIG. 5 is a schematic diagram illustrating a pixel coordinate system of a digital image according to some embodiments of the present disclosure.

FIG. 5 is a schematic diagram illustrating a pixel coordinate system of a digital image according to some embodiments of the present disclosure.

Exemplarily, as shown in FIG. 5, the gray area is a digital image. The point labeled as R is a pixel coordinate (0,0). X indicates the X axis (the horizontal direction), and Y indicates the Y axis (the vertical direction).

Step S4-$a2$: coordinate information of four corner points of a first bounding box including:

a coordinate of $a_{11}$ being denoted as $(x_{11},y_{11})$, a coordinate of $a_{12}$ being denoted as $(x_{12},y_{12})$, a coordinate of $a_{13}$ being denoted as $(x_{13},y_{13})$, a coordinate of $a_{14}$ being denoted as $(x_{14},y_{14})$;

Step S4-$a3$: assuming that the positional coordinates of the vertices at the outermost periphery of the four bounding boxes are $Q_1(x_{Q1},y_{Q1})$, $Q_2(x_{Q2},y_{Q2})$, $Q_3(x_{Q3},$ $y_{Q3}$), and $Q_4(x_{Q4},y_{Q4})$. $Q_1$ is located at the topmost part of the binary dot matrix code pattern, $Q_2$ is located at the bottom part of the binary dot matrix code pattern, $Q_3$ is located at the leftmost part of the binary dot matrix code pattern, and $Q_4$ is located at the rightmost part of the binary dot matrix code pattern, calculating coordinates of individual vertices as shown in equations (1)-(8) below:

$Q_1$ is located at the topmost part of the binary dot matrix code pattern, which with a vertical coordinate $y_{Q_1}$ is a point with a smallest vertical coordinate in the set P, as shown in equations (1) and (2) below:

$$y_{Q_1} = \min(y_{ij}), i, j \in [1, 4] \tag{1}$$

$$Q_1 = \{(x_{ij}, y_{ij}) \in P, y_{ij} = y_{Q_1}\}, i, j \in [1, 4] \tag{2}$$

$Q_2$ is located at the bottom part of the binary dot matrix code pattern, which with a longitudinal coordinate $y_{Q_2}$ is a point with a largest longitudinal coordinate in the se P, as shown in equations (3) and (4) below:

$$y_{Q_2} = \max(y_{ij}), i, j \in [1, 4] \tag{3}$$

$$Q_2 = \{(x_{ij}, y_{ij}) \in P, y_{ij} = y_{Q_2}\}, i, j \in [1, 4] \tag{4}$$

$Q_3$ is located at the leftmost part of the binary dot matrix code pattern, which with a transverse coordinate $x_{Q_3}$ is a smallest transverse coordinate in the set P, as shown in equations (5) and (6) below:

$$x_{Q_3} = \min(x_{ij}), i, j \in [1, 4] \tag{5}$$

$$Q_3 = \{(x_{ij}, y_{ij}) \in P, x_{ij} = x_{Q_3}\}, i, j \in [1, 4] \tag{6}$$

$Q_4$ is located at the rightmost part of the binary dot matrix code pattern, which a transverse coordinate $x_{Q_4}$ is the point with the largest transverse coordinate in the set of points P, as shown in equations (7) and (8) below:

$$x_{Q_4} = \max(x_{ij}), i, j \in [1, 4] \tag{7}$$

$$Q_4 = \{(x_{ij}, y_{ij}) \in P, x_{ij} = x_{Q_4}\}, i, j \in [1, 4] \tag{8}$$

In some embodiments, a filtering process of a second filtering strategy is as follows:

constructing the 16 corner points of the bounding boxes frames outputted by the YOLOv8 network model in the Step S3 into the set W, wherein each coordinate of each point $w_m$ are $(x_m,y_m)$.

For any point $w_m$, a distance between the points $w_m$ from the other 15 corner points $w_n(m \neq n)$ is defined as $d(w_m,w_n)$, which is calculated using a Euclidean distance equation (9)

$$d(w_m, w_n) = \sqrt{(x_m - x_n)^2 + (y_m - y_n)^2}, m, n \in [1, 16], m \neq n \tag{9}$$

calculating a sum of distances between the point $w_m$ and the other 15 corner points using a following equation (10):

$$S_{w_m} = \sum_{n=1,m \neq n}^{16} d(w_m, w_n), m, n \in [1, 16] \tag{10}$$

By comparing all $S_{w_m}$, selecting points corresponding to a first 4 larges $S_{w_m}$ as 4 peripheral vertices of the binary dot matrix code, wherein an expression equation is as follows: assuming that all $S_{w_m}$ are sorted in descending order to obtain a sorted sequence as follows (11):

$$S_{w_1} \geq S_{w_2} \geq \dots \geq S_{w_{16}} \tag{11}$$

selecting a set P' corresponding to points of the first 4 largest $S_{w_m}$ as:

$$P' = \{w_1, w_2, w_3, w_4\} \tag{12}$$

The vertices at the outermost periphery of the four bounding boxes may be selected by both of above processes.

Step S5, perspective correction: obtaining a distorted quadrilateral based on the positional coordinates of the vertices at the outermost periphery of the four bounding boxes, and converting the distorted quadrilateral into a standard L×L square pattern by perspective transformation.

In some embodiments, a transformation equation of the perspective transformation is a transformation process of converting a pixel coordinate (u,v) from a point on a three-dimensional world coordinate system to a two-dimensional plane pixel coordinate (x',y').

The transformation equation (13) for perspective transformation is as follows:

$$\begin{bmatrix} x' \\ y' \\ z' \end{bmatrix} = \begin{bmatrix} b_{11} & b_{12} & b_{13} \\ b_{21} & b_{22} & b_{23} \\ b_{31} & b_{32} & b_{33} \end{bmatrix} \begin{bmatrix} u \\ v \\ 1 \end{bmatrix} \tag{13}$$

wherein a coordinate of an original image in a two-dimensional plane is (u,v). (x',y',z') is a coordinate of a converted three-dimensional world.

The perspective transformation matrix $$\begin{bmatrix} b_{11} & b_{12} & b_{13} \\ b_{21} & b_{22} & b_{23} \\ b_{31} & b_{32} & b_{33} \end{bmatrix}$$

is split into 3 parts, $$\begin{pmatrix} b_{11} & b_{12} \\ b_{21} & b_{22} \end{pmatrix}$$

is configured as linear transformation, $$\begin{pmatrix} b_{13} \\ b_{23} \end{pmatrix}$$

is configured as the perspective transformation, and $(b_{31},b_{32})$ is configured as translation operation.

A pixel coordinate (u,v) is transformed to a point on the three-dimensional world coordinate system, and transformed to a new two-dimensional plane to obtain a corrected coordinate (x,y), and equations (14) and (15) is shown as follows:

$$x = \frac{x'}{z'} = \frac{b_{11}u + b_{21}v + b_{31}}{b_{13}u + b_{23}v + b_{33}} \tag{14}$$

$$y = \frac{y'}{z'} = \frac{b_{12}u + b_{22}v + b_{32}}{b_{13}u + b_{23}v + b_{33}} \tag{15}$$

Assuming that the size of the standard binary dot matrix code is L, the 4 peripheral vertices of the standard binary dot matrix code defined on the new two-dimensional plane are $Q'_1(0,0)$, $Q'_2(L,0)$, $Q'_3(0,L)$, $Q'_4(L,L)$; through the step S4, the 4 vertices $Q_1$, $Q_2$, $Q_3$, $Q_4$ of the binary dot matrix code are obtained, and the corresponding points after perspective transformation are $Q'_1$, $Q'_2$, $Q'_3$, $Q'_4$.

Here is an embodiments of perspective transformation: assuming that the size of the standard binary dot matrix code pattern is L=300, then the specification of the binary dot matrix code is 300×300, and the coordinates of the 4 vertices are $Q'_1(0,0)$, $Q'_2(300, 0)$, $Q'_3(0,300)$, $Q'_4(300,300)$, respectively.

Assuming that the coordinates of the peripheral vertices $Q_1$, $Q_2$, $Q_3$, $Q_4$ of the original binary dot matrix code pattern are:

$Q_1(23.3625,10.4983)$, $Q_2(185.0730,206.0371)$, $Q_3(2.3291,189.7386)$, and $Q_4(211.6296,26.8318)$.

By substituting the peripheral vertices $Q_1$, $Q_2$, $Q_3$, and $Q_4$ of the original binary dot matrix code pattern and the peripheral vertices $Q'_1$, $Q'_2$, $Q'_3$, and $Q'_4$ of the standard binary dot matrix code pattern after perspective transformation into the equation (13), the perspective transformation matrix may be obtained as follows:

$$\begin{bmatrix} b_{11} & b_{12} & b_{13} \\ b_{21} & b_{22} & b_{23} \\ b_{31} & b_{32} & b_{33} \end{bmatrix} = \begin{bmatrix} 1.5798 & 0.18538 & -38.854 \\ -0.13943 & 1.6072 & -13.615 \\ 2.715e-05 & -0.0001584 & 1 \end{bmatrix}.$$

Step S6, calculating a counterclockwise rotation angle: inputting the square pattern obtained in the step S5 into the trained and upgraded YOLOv8 network model of the step S2 for detection, and outputting four corner points of bounding boxes corresponding to a fiducial marker of the square pattern;

obtaining a coordinate of a center point G of the bounding boxes based on the four corner points of the bounding boxes;

comparing the coordinate of the center point G of the bounding boxes with a coordinate of a center point $$O\left(\frac{L}{2}, \frac{L}{2}\right)$$

of the square pattern obtained in the step S5 to obtain a counterclockwise rotation angle θ of the square pattern.

In some embodiments, the process for obtaining the counterclockwise rotation angle θ are as follows:

Step S6-1: assuming that the four corner points of the bounding boxes corresponding to the fiducial marker of the square pattern are denoted as $T_r$ and coordinates are denoted as$(x_r,y_r)$, wherein r∈ [1,4], coordinates of the center point $G(x_G,y_G)$ of the bounding boxes and the center point G of the bounding boxes is calculating by equations (16) and (17):

$$x_G = \frac{\sum_{r=1}^4 x_r}{4} \tag{16}$$

$$y_G = \frac{\sum_{r=1}^4 y_r}{4} \tag{17}$$

Step S6-2: determining the counterclockwise rotation angle θ of the square pattern by comparing the coordinate of the center point $G(x_G,y_G)$ of the bounding boxes with a coordinate of a center point $$O\left(\frac{L}{2}, \frac{L}{2}\right)$$

of the square pattern of the step S5, wherein a corresponding relationship is as follows:

$$\theta = \begin{cases} 0, & x_G > \frac{L}{2} \text{ and } y_G > \frac{L}{2} \\ 90, & x_G < \frac{L}{2} \text{ and } y_G > \frac{L}{2} \\ 180, & x_G < \frac{L}{2} \text{ and } y_G < \frac{L}{2} \\ 270, & x_G > \frac{L}{2} \text{ and } y_G < \frac{L}{2} \end{cases} \tag{18}$$

Here is an embodiment of calculating a rotation angle. Assuming that a specification of the square pattern of the coordinate of the bounding box center point G(40,80) is 100×100, $$\frac{L}{2} = 50,$$

and there exists the following relationship for the coordinate:

$$x_G < \frac{L}{2}$$

$$y_G > \frac{L}{2}$$

Therefore, it may be obtained that θ=90.

Step S7, rotational correction: rotating the square pattern of the step S5 counterclockwise by an angle θ by affine transformation to align the square pattern to a correct position to obtain a standard pattern of binary dot matrix code images of the test set.

In some embodiments, the operations for obtaining the standard pattern of binary dot matrix code images of the test set are as follows:

Assuming that a point $U(x_u,y_u)$ on the binary dot matrix code pattern after the perspective correction in the step S5 is rotated counterclockwise by an angle θ; wherein a rotation process is as follows:

calculating a coordinate $(x_c,y_c)$ of the point $U(x_u,y_u)$ with respect to the center point $$O\left(\frac{L}{2}, \frac{L}{2}\right).$$

$$x_c = x_u - \frac{L}{2} \tag{19}$$

$$y_c = y_u - \frac{L}{2} \tag{20}$$

applying a rotation matrix R to rotate $(x_c, y_c)$ to obtain a coordinate $(x_h, y_h)$:

$$R = \begin{bmatrix} \cos(\theta) & -\sin(\theta) \\ \sin(\theta) & \cos(\theta) \end{bmatrix} \tag{21}$$

$$\begin{bmatrix} x_h \\ y_h \end{bmatrix} = R \cdot \begin{bmatrix} x_c \\ y_c \end{bmatrix} \tag{22}$$

translating $(x_h, y_h)$ back to an original position to obtain a final rotation point $U'(x_{new}, y_{new})$:

$$x_{new} = x_h + \frac{L}{2} \tag{23}$$

$$y_{new} = y_h + \frac{L}{2} \tag{24}$$

by combining above steps, obtaining a coordinate $U(x_u, y_u)$ by rotating the point $U'(x_{new}, y_{new})$ about the center point by the angle $\theta$:

$$x_{new} = \cos(\theta) \cdot \left(x_u - \frac{L}{2}\right) - \sin(\theta) \cdot \left(y_u - \frac{L}{2}\right) + \frac{L}{2} \tag{25}$$

$$y_{new} = \sin(\theta) \cdot \left(x_u - \frac{L}{2}\right) - \cos(\theta) \cdot \left(y_u - \frac{L}{2}\right) + \frac{L}{2} \tag{26}$$

Figure 6:
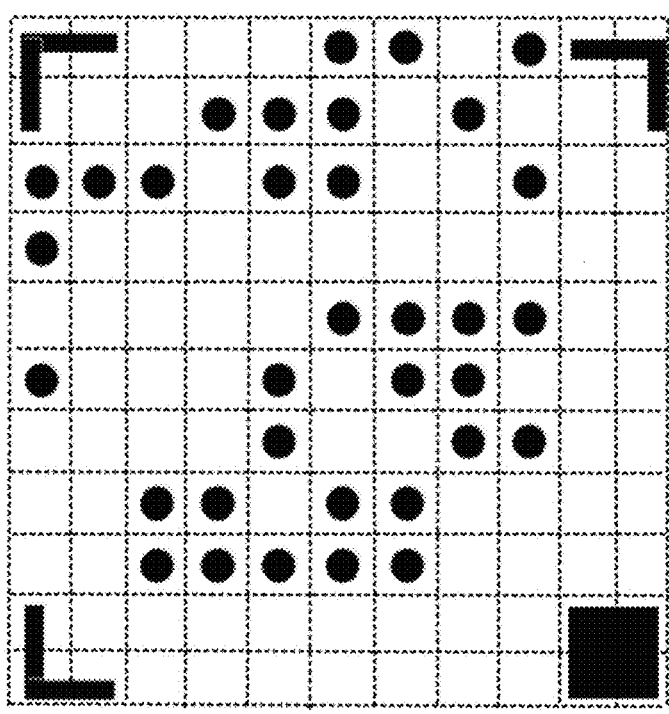
FIG. 6 is a schematic diagram illustrating a process for dividing image blocks according to some embodiments of the present disclosure.

Step S8, code point identification: dividing the standard pattern into image blocks with a same size in equal portions based on a dimension of binary code dots; and inputting the image blocks into the trained and upgraded YOLOv8 network model of the step S2 sequentially in the order of top to bottom and left to right for identification;

in response to determining that a code point exists in the image blocks, outputting 1, and in response to determining that there is no code point in the image blocks, outputting 0;

finally, concatenating the identification results to obtain a binary-encoded sequence data;

In some embodiments, the code point identification includes the following steps:

FIG. 6 is a schematic diagram of dividing image blocks according to some embodiments of the present disclosure.

Step S8-1, dividing a binary dot matrix code standard pattern into image blocks: based on the dimension of the binary code dots, the binary dot matrix code standard pattern rotated to the correct position in step S7 is divided into the image blocks with the same size in equal portions, as shown in FIG. 6. The dimension of the binary code dots refers to a quantity distribution of the binary code dots in the horizontal and vertical directions, which is the matrix dimension formed by the code points. When dividing a standard pattern into the image blocks with the same size in equal portions, the quantity of the binary code points in the horizontal and vertical directions may determine the overall size and structure of the pattern, which in turn affects the image block division process.

Step S8-2, image blocks identification code point: identifying circular binary code points of the image blocks sequentially in the order of top to bottom and left to right by using the trained and upgraded YOLOv8 network model in the step S2, in response to determining that a code point exists in the image blocks, outputting 1, and in response to determining that there is no code point in the image blocks, outputting 0, and identifying and obtaining a binary coding sequence 01.

Step S9, decoding: decoding the binary-encoded sequence data based on binary-encoded decoding rules, and deriving corresponding binary-encoded character information.

In some embodiments, the mold surface binary dot matrix code identification process further includes: querying a second preset table based on the binary-encoded character information in the step S9 to determine working parameters; the working parameters including a heating rate of a heating unit and a hydraulic pressure of a stamping press hydraulic valve; and based on the working parameters, controlling the heating unit to heat the mold at the heating rate, and adjusting the stamping press hydraulic valve to the hydraulic pressure.

The binary-encoded character information refers to readable character data obtained by decoding the binary dot matrix code, which is used for the full lifecycle management of the mold (e.g., the working parameters such as controlling heating and stamping).

The second preset table includes a corresponding relationship between the binary-encoded character information and the working parameters. In some embodiments, the second preset table is preset based on experience.

The working parameters refer to parameters related to the work execution of the mold. The working parameters may include the heating rate of the heating unit and the hydraulic pressure of the stamping press hydraulic valve. The working parameters may also include the heating temperature of the mold, the molding frequency, or the like.

The heating unit refers to a device used for heating the mold. For example, the heating unit includes a heating plate, a ceramic heater, an oil temperature machine, or the like.

The stamping press refers to a device that performs stamping and forming of molds driven by hydraulic pressure. In some embodiments, according to binary-encoded character information, the working parameters of the stamping press (e.g., hydraulic pressure, stroke) may be adjusted to adapt to the production needs of different molds.

The stamping press hydraulic valve refers to a component that adjusts the hydraulic pressure applied to the mold and is the core control element of the stamping press power system. For example, the stamping press hydraulic valve includes a proportional relief valve, a servo flow valve, a high-frequency directional valve, or the like.

In some embodiments, the processor, based on the working parameters, controls the heating unit to heat the mold at the heating rate corresponding to the working parameter, and adjusts the stamping press hydraulic valve to the hydraulic pressure corresponding to the working parameter.

The embodiments of present disclosure, based on the binary-encoded character information, determine the working parameter, and then, based on the working parameter, control the mold to perform production operations, which can avoid damage to the mold caused by inappropriate working parameters.

The specific embodiments of the two types of filtering processes in step S6 of the embodiments of present disclosure are as follows:

For the first filtering process, assuming that after the fiducial marker detection of the binary dot matrix code image, the YOLOv8 network outputs coordinates of the 16 corner points from 4 bounding boxes as follows:

The first bounding box: $a_{11}$(2.3291, 189.7386), $a_{12}$ (31.8235, 190.5836), $a_{13}$(32.6759,160.8312), $a_{14}$(3.1815, 159.9861); the second bounding box: $a_{21}$(55.0101,42.9026), $a_{22}$(56.1172,11.6590), $a_{23}$(23.3625,10.4983), $a_{24}$(22.2553, 41.7419); the third bounding box: $a_{31}$((180.4171,57.0028), $a_{32}$(210.5101,58.0810), $a_{33}$(211.6296,26.8318), $a_{34}$ (181.5367,25.7537); the fourth bounding box: $a_{41}$(185.0730, 206.0371), $a_{42}$(185.9736,177.9098), $a_{43}$(154.1791, 176.8919), $a_{44}$(153.2786,205.0192).

The vertex filtering rule is applied to the coordinates of the 16 corner points to obtain:

$Q_1$ is located at a topmost part of the binary dot matrix code pattern, which with a vertical coordinate $y_{Q_1}$ is a point with a smallest vertical coordinate in the set P, then a corresponding corner point is $a_{23}$(23.3625, 10.4983).

$Q_2$ is located at a bottom part of the binary dot matrix code pattern, which with a longitudinal coordinate $y_{Q_2}$ is a point with a largest longitudinal coordinate in the set P, then a corresponding corner point is $a_{41}$(185.0730, 206.0371).

$Q_3$ is located at a leftmost part of the binary dot matrix code pattern, which with a transverse coordinate $x_{Q_3}$ is a smallest transverse coordinate in the set P, and a corresponding corner point is $a_{11}$(2.3291, 189.7386).

$Q_4$ is located at a rightmost part of the binary dot matrix code pattern, which a transverse coordinate $x_{Q_4}$ is a largest transverse coordinate in the set P, then a corresponding corner point is $a_{33}$(211.6296,26.8318).

For the second filtering process, an embodiments is given for detailed description: assuming that after the fiducial marker detection of the binary dot matrix code image, the YOLOv8 network outputs the coordinates of 16 corner points of four bounding boxes as follows: $w_1$(9,3), $w_2$(6,9), $w_3$(1,5), $w_4$(7,10), $w_5$(3,7), $w_6$(3,10), $w_7$(9,2), $w_8$(7,6), $w_9$(5,0), $w_{10}$(2,6), $w_{11}$(1,10), $w_{12}$(3,6), $w_{13}$(8,2), $w_{14}$(9,7), $w_{15}$(3,5), $w_{16}$(7,8).

A sum of distances $S_{w_m}$ between point $w_m$ and other points $w_n$ (retaining two decimal places) is shown as follows:

A sum of distances between point $w_1$(9,3) and other points is: 90.35; a sum of distances between point $w_2$(6,9) and other points is: 72.77; a sum of distances between point $w_3$(1,5) and other points is: 84.92; a sum of distances between point $w_4$(7,10) and other points is: 86.08; a sum of distances between point $w_5$(3,7) and other points is: 66.07; a sum of distances between point $w_6$(3,10) and other points is: 86.36; a sum of distances between point $w_7$(9,2) and other points is: 97.78; a sum of distances between point $w_8$(7,6) and other points is: 66.12; a sum of distances between point $w_9$(5,0) and other points is: 108.03; a sum of distances between point $w_{10}$(2,6) and other points is: 71.95; a sum of distances between point $w_{11}$(1,10) and other points is: 101.11; a sum of distances between point $w_{12}$(3,6) and other points is: 64.81; a sum of distances between point $w_{13}$(8,2) and other points is: 90.86; a sum of distances between point $w_{14}$(9,7) and other points is: 82.82; a sum of distances between point $w_{15}$(3,5) and other points is: 67.90; a sum of distances between point $w_{16}$(7,8) and other points is: 70.17.

By sorting all the $S_{w_i}$, the top 4 largest results of $S_{w_i}$ are selected as follows:

A sum of the distances between point $w_9$(5,0) and the other points is: 108.03; a sum of distances between point $w_{11}$(1,10) and other points is: 101.11; a sum of distances between point $w_7$(9,2) and other points is: 97.78; a sum of distances between point $w_{13}$(8,2) and other points is: 90.86; therefore, $P'=\{w_9, w_{11}, w_7, w_{13}\}$.

The embodiments of the present disclosure, through the YOLOv8 network model, perform fiducial marker detection on the mold surface binary dot matrix code images, and then, through a filtering strategy, calculate the outermost vertices of the bounding box. Subsequently, through perspective correction, calculating the counterclockwise rotation angle, rotational correction, code point identification, and decoding, the identification of mold binary codes with different lighting, rotation, and size variations is achieved, which can greatly improve the identification rate of mold surface binary codes.

The basic concepts have been described above, and it is apparent to those skilled in the art that the foregoing detailed disclosure is intended only as an example and does not constitute a limitation of the present disclosure. While not expressly stated herein, a person skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

In addition, the order of processing elements and sequences, the use of numerical letters, or the use of other names described in the present disclosure are not intended to qualify the order of the processes and methods of the present disclosure, unless expressly stated in the claims. While some embodiments of the invention that are currently considered useful are discussed in the foregoing disclosure by way of various examples, it should be appreciated that such details serve only illustrative purposes, and that additional claims are not limited to the disclosed embodiments; rather, the claims are intended to cover all amendments and equivalent combinations that are consistent with the substance and scope of the embodiments of the present disclosure.

For each patent, patent application, patent application disclosure, and other materials cited in the present disclosure, such as articles, books, manuals, publications, documents, etc., the entire contents of which are hereby incorporated by reference herein. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those set forth herein, the descriptions, definitions, and/or use of terms in the present disclosure shall prevail.

Finally, it should be understood that the embodiments described in the present disclosure are used only to illustrate the principles of the embodiments of the present disclosure. Other variations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for identifying a binary dot matrix code on a mold surface, comprising:

step S1, data acquisition: capturing a plurality of binary dot matrix code images of the mold surface by a camera, wherein a fiducial marker is arranged in each of four corners of each of the plurality of binary dot matrix code images, and a training set is constructed through annotating bounding boxes for each fiducial marker;

step S2, model training: inputting data from the training set into a You Only Look Once version 8 (YOLOv8) network model to train the YOLOv8 network model to obtain optimal weight data of the YOLOv8 network model, and obtaining a trained and upgraded YOLOv8 network model by loading the optimal weight data into the YOLOv8 network model again;

step S3, fiducial marker detection: capturing binary dot matrix code images of a mold surface to be tested by the camera to form a test set, inputting images of the test set to the trained and upgraded YOLOv8 network model, and outputting corner points of four bounding boxes of data of the test set by model training, each of the four bounding boxes is provided with 4 corner points, respectively, totaling 16 corner points;

step S4, calculating peripheral vertices: filtering the 16 corner points by a filtering strategy, and calculating positional coordinates of vertices at an outermost periphery of the four bounding boxes;

step S5, perspective correction: obtaining a distorted quadrilateral based on the positional coordinates of the vertices at the outermost periphery of the four bounding boxes, and converting the distorted quadrilateral into a standard L×L square pattern by perspective transformation;

step S6, calculating a counterclockwise rotation angle: inputting the square pattern obtained in the step S5 into the trained and upgraded YOLOv8 network model of the step S2 for detection, and outputting four corner points of bounding boxes corresponding to a fiducial marker of the square pattern;

obtaining a coordinate of a center point G of the bounding boxes based on the four corner points of the bounding boxes;

comparing the coordinate of the center point G of the bounding boxes with a coordinate of a center point $$O\left(\frac{L}{2}, \frac{L}{2}\right)$$

of the square pattern obtained in the step S5 to obtain a counterclockwise rotation angle $\theta$ of the square pattern;

step S7, rotational correction: rotating the square pattern of the step S5 counterclockwise by an angle $\theta$ by perspective transformation to align the square pattern to a correct position to obtain a standard pattern of binary dot matrix code images of the test set;

step S8, code point identification: dividing the standard pattern into image blocks with a same size in equal portions based on a dimension of a binary code dots; and inputting the image blocks into the trained and upgraded YOLOv8 network model of the step S2 sequentially in the order of top to bottom and left to right for identification;

in response to determining that a code point exists in the image blocks, outputting 1, and in response to determining that there is no code point in the image blocks, outputting 0;

concatenating identification results to obtain binary-encoded sequence data; and step S9, decoding: decoding the binary-encoded sequence data based on binary-encoded decoding rules and deriving corresponding binary-encoded character information.

2. The method of claim 1, wherein the filtering strategy is categorized into two types, and the filtering strategy includes a first filtering strategy and a second filtering strategy, wherein:

a filtering process of the first filtering strategy is as follows:

step S4-$a$1: constructing the 16 corner points of the four bounding boxes output by the YOLOv8 network model in the Step S3 into a set P, wherein each corner point is denoted as $a_{ij}$, a coordinate of each corner point is denoted as $(x_{ij}, y_{ij})$, i denotes numbers of the bounding boxes, which takes a range of $i \in \{1,2,3,4\}$, and j denotes the jth point of the four corner points of the bounding boxes, which takes a range of $j \in \{1,2,3,4\}$;

step S4-$a$2: coordinate information of four corner points of a first bounding box including:

a coordinate of $a_{11}$ being denoted as $(x_{11}, y_{11})$, a coordinate of $a_{12}$ being denoted as $(x_{12}, y_{12})$, a coordinate of $a_{13}$ being denoted as $(x_{13}, y_{13})$, a coordinate of $a_{14}$ being denoted as $(x_{14}, y_{14})$;

step S4-$a$3: assuming that positional coordinates of vertices at the outermost periphery of the four bounding boxes are $Q_1$ $(x_{Q1}, y_{Q1})$, $Q_2(x_{Q2}, y_{Q2})$, $Q_3$ $(x_{Q3}, y_{Q3})$, $Q_4$ $(x_{Q4}, y_{Q4})$, and $Q_1$ is located at a topmost part of a binary dot matrix code pattern, $Q_2$ is located at a bottom part of the binary dot matrix code pattern, $Q_3$ is located at a leftmost part of the binary dot matrix code pattern, and $Q_4$ is located at a rightmost part of the binary dot matrix code pattern, coordinates of individual vertices being calculated as follows:

$Q_1$ is located at the topmost part of the binary dot matrix code pattern, which with a vertical coordinate $y_{Q1}$ is a point with a smallest vertical coordinate in the set P, as shown in equations (1) and (2) below:

$$y_{Q_1} = \min(y_{ij}), \quad i, j \in [1, 4] \tag{1}$$

$$Q_1 = \{(x_{ij}, y_{ij}) \in P, y_{ij} = y_{Q_1}\}, \quad i, j \in [1, 4] \tag{2}$$

$Q_2$ is located at the bottom part of the binary dot matrix code pattern, which with a longitudinal coordinate $y_{Q2}$ is a point with a largest longitudinal coordinate in the set P, as shown in equations (3) and (4) below:

$$y_{Q_2} = \max(y_{ij}), \quad i, j \in [1, 4] \tag{3}$$

$$Q_2 = \{(x_{ij}, y_{ij}) \in P, y_{ij} = y_{Q_2}\}, \quad i, j \in [1, 4] \tag{4}$$

$Q_3$ is located at the leftmost part of the binary dot matrix code pattern, which with a transverse coordinate $x_{Q3}$ is a smallest transverse coordinate in the set P, as shown in equations (5) and (6) below:

$$x_{Q_3} = \min(x_{ij}), \quad i, j \in [1, 4] \tag{5}$$

$$Q_3 = \{(x_{ij}, y_{ij}) \in P, x_{ij} = x_{Q_3}\}, \quad i, j \in [1, 4] \tag{6}$$

$Q_4$ is located at the rightmost part of the binary dot matrix code pattern, which a transverse coordinate $x_{Q4}$ is a largest transverse coordinate in the set P, as shown in equations (7) and (8) below:

$$x_{Q_4} = \max(x_{ij}), \quad i, j \in [1, 4] \tag{7}$$

$$Q_4 = \{(x_{ij}, y_{ij}) \in P, x_{ij} = x_{Q_4}\}, \quad i, j \in [1, 4]. \tag{8}$$

3. The method of claim 2, wherein a filtering process of the second filtering strategy is as follows:

constructing the 16 corner points of the four bounding boxes outputted by the YOLOv8 network model in the step S3 into the set W, wherein each coordinate of each point $w_m$ is $(x_m, y_m)$;

wherein for any point $w_m$, a distance between the point $w_m$ from the other 15 corner points $w_n$ ($m{\neq}n$) is defined as d $(w_m, w_n)$, which is calculated using a Euclidean distance equation (9):

$$d(w_m, w_n) = \sqrt{(x_m - x_n)^2 + (y_m - y_n)^2}, \quad m, n \in [1, 16], m \neq n \tag{9}$$

calculating a sum of distances between the point $w_m$ and the other 15 corner points using a following equation (10):

$$S_{w_m} = \sum_{n=1, m \neq n}^{16} d(w_m, w_n), \quad m, n \in [1, 16] \tag{10}$$

by comparing all $S_{w_m}$, selecting points corresponding to a first 4 largest $S_{w_m}$ as 4 peripheral vertices of the binary dot matrix code, wherein an expression equation is as follows:

assuming that all $S_{w_m}$ are sorted in descending order to obtain a sorted sequence as follows (11):

$$S_{w_1} \geq S_{w_2} \geq \dots \geq S_{w_{16}} \tag{11}$$

selecting a set $S_{w_m}$ corresponding to points of the first 4 largest P' as:

$$P' = \{w_1, w_2, w_3, w_4\}. \tag{12}$$

4. The method of claim 1, wherein a transformation equation of the perspective transformation is a transformation process of converting a pixel coordinate (u, v) to a point on a three-dimensional world coordinate system, and transforming the point to another pixel coordinate (x', y'), a transformation equation (13) of the perspective transformation is as follows:

$$\begin{bmatrix} x' \\ y' \\ z' \end{bmatrix} = \begin{bmatrix} b_{11} & b_{12} & b_{13} \\ b_{21} & b_{22} & b_{23} \\ b_{31} & b_{32} & b_{33} \end{bmatrix} \begin{bmatrix} u \\ v \\ 1 \end{bmatrix} \tag{13}$$

wherein a coordinate of an original image in a two-dimensional plane is (u, v), (x', y', z') is a coordinate of a converted three-dimensional world;

the perspective transformation matrix $$\begin{bmatrix} b_{11} & b_{12} & b_{13} \\ b_{21} & b_{22} & b_{23} \\ b_{31} & b_{32} & b_{33} \end{bmatrix}$$

is split into 3 parts, $$\begin{pmatrix} b_{11} & b_{12} \\ b_{21} & b_{22} \end{pmatrix}$$

is configured as linear transformation, $$\begin{pmatrix} b_{13} \\ b_{23} \end{pmatrix}$$

is configured as the perspective transformation, $(b_{31}, b_{32})$ is configured as translation operation.

5. The method of claim 3, wherein in the perspective transformation, a pixel coordinate (u, v) is transformed to a point on the three-dimensional world coordinate system, and transformed to a new two-dimensional plane to obtain a corrected coordinate of (x, y), and equations (14) and (15) is shown as follows:

$$x = \frac{x'}{z'} = \frac{b_{11}u + b_{21}v + b_{31}}{b_{13}u + b_{23}v + b_{33}} \tag{14}$$

$$y = \frac{y'}{z'} = \frac{b_{12}u + b_{22}v + b_{32}}{b_{13}u + b_{23}v + b_{33}}. \tag{15}$$

6. The method of claim 1, wherein the obtaining the counterclockwise rotation angle $\theta$ of the square pattern in the step S6 includes:

step S6-1: assuming that the four corner points of the bounding boxes corresponding to the fiducial marker of the square pattern are denoted as $T_r$ and coordinates are denoted as $(x_r, y_r)$, wherein $r \in [1,4]$, coordinates of the center point G $(x_G, y_G)$ of the bounding boxes and the center point G of the bounding boxes is calculating by equations (16) and (17):

$$x_G = \frac{\sum_{r=1}^{4} x_r}{4}; \tag{16}$$

$$y_G = \frac{\sum_{r=1}^{4} y_r}{4}; \tag{17}$$

step S6-2: determining the counterclockwise rotation angle $\theta$ of the square pattern by comparing the coordinate of the center point G $(x_G, y_G)$ of the bounding boxes with a coordinate of a center point $$O\left(\frac{L}{2}, \frac{L}{2}\right)$$

of the square pattern of the step S5, wherein a corresponding relationship is as follows:

$$\theta = \begin{cases} 0, & x_G > \frac{L}{2} \text{ and } y_G > \frac{L}{2} \\ 90, & x_G < \frac{L}{2} \text{ and } y_G > \frac{L}{2} \\ 180, & x_G < \frac{L}{2} \text{ and } y_G < \frac{L}{2} \\ 270, & x_G > \frac{L}{2} \text{ and } y_G < \frac{L}{2} \end{cases} \quad (18)$$

7. The method of claim 6, wherein the obtaining the standard pattern of binary dot matrix code images of the test set in the step S7 includes:

assuming that a point $U(x_u, y_u)$ on the binary dot matrix code pattern after the perspective correction in the step S5 is rotated counterclockwise by an angle $\theta$;

wherein a rotation process is as follows:

calculating a coordinate $(x_c, y_c)$ of the point $U(x_u, y_u)$ with respect to the center point $$O\left(\frac{L}{2}, \frac{L}{2}\right):$$

$$x_c = x_u - \frac{L}{2} \quad (19)$$

$$y_c = y_u - \frac{L}{2} \quad (20)$$

applying a rotation matrix R to rotate $(x_c, y_c)$ to obtain a coordinate $(x_h, y_h)$:

$$R = \begin{bmatrix} \cos(\theta) & -\sin(\theta) \\ \sin(\theta) & \cos(\theta) \end{bmatrix} \quad (21)$$

$$\begin{bmatrix} x_h \\ y_h \end{bmatrix} = R \cdot \begin{bmatrix} x_c \\ y_c \end{bmatrix} \quad (22)$$

translating $(x_h, y_h)$ back to an original position to obtain a final rotation point $U'(x_{new}, y_{new})$:

$$x_{new} = x_h + \frac{L}{2} \quad (23)$$

$$y_{new} = y_h + \frac{L}{2} \quad (24)$$

obtaining a coordinate by rotating the point about the center point by the $\theta$:

$$x_{new} = \cos(\theta) \cdot \left(x_u = \frac{L}{2}\right) - \sin(\theta) \cdot \left(y_u - \frac{L}{2}\right) + \frac{L}{2} \quad (25)$$

$$y_{new} = \sin(\theta) \cdot \left(x_u = \frac{L}{2}\right) - \cos(\theta) \cdot \left(y_u - \frac{L}{2}\right) + \frac{L}{2}. \quad (26)$$

8. The method of claim 1, wherein the code point identification in the step S8 includes:

step S8-1, dividing a binary dot matrix code standard pattern into the image blocks: based on the dimension of the binary code dots, dividing the binary dot matrix code standard pattern rotated to the correct position in the step S7 into the image blocks with the same size in equal portions; and step S8-2, image blocks identification code point: identifying circular binary code points of the image blocks sequentially in the order of top to bottom and left to right by using the trained and upgraded YOLOv8 network model in the step S2, in response to determining that a code point exists in the image blocks, outputting 1, and in response to determining that there is no code point in the image blocks, outputting 0, and identifying and obtaining a binary coding sequence 01.

* * * * *